(12) United States Patent
Kobayashi (10) Patent No.: US 9,082,163 B2
(45) Date of Patent: Jul. 14, 2015

(54) IMAGE PROCESSING DEVICE

(71) Applicant: Masahiro Kobayashi, Kobe-shi, Hyogo (JP)

(72) Inventor: Masahiro Kobayashi, Hyogo (JP)

(73) Assignee: Masahiro Kobayashi, Hyogo (JP)

( * ) Notice: Subject to any disclaimer, the term of this patent is extended or adjusted under 35 U.S.C. 154(b) by 6 days.

(21) Appl. No.: 13/897,913

(22) Filed: May 20, 2013

(65) Prior Publication Data

US 2013/0308859 A1    Nov. 21, 2013

(30) Foreign Application Priority Data

May 21, 2012    (JP) .................................. 2012-115548

(51) Int. Cl.
*G06K 9/00*        (2006.01)
*G06K 9/34*        (2006.01)
*G06T 5/00*        (2006.01)

(52) U.S. Cl.
CPC ................. *G06T 5/001* (2013.01); *G06T 5/008* (2013.01); *G06T 2200/21* (2013.01); *G06T 2207/10024* (2013.01); *G06T 2207/20012* (2013.01); *G06T 2207/20208* (2013.01)

(58) Field of Classification Search
None
See application file for complete search history.

(56) References Cited

U.S. PATENT DOCUMENTS

| 6,049,626 | A  | * | 4/2000  | Kim ............................. 382/167 |
| 6,078,686 | A  | * | 6/2000  | Kim ............................. 382/167 |
| 6,507,372 | B1 | * | 1/2003  | Kim ............................. 348/630 |
| 7,110,046 | B2 | * | 9/2006  | Lin et al. ...................... 348/679 |
| 7,176,965 | B1 | * | 2/2007  | Noguchi .................... 348/222.1 |
| 7,450,756 | B2 | * | 11/2008 | Bloom et al. ................ 382/167 |
| 8,139,828 | B2 | * | 3/2012  | Huo et al. .................... 382/128 |
| 2006/0245643 | A1 | * | 11/2006 | Bloom et al. ................ 382/167 |
| 2010/0034272 | A1 | * | 2/2010  | Miyazaki et al. ........ 375/240.16 |

FOREIGN PATENT DOCUMENTS

| JP | 2002-142150 A | 5/2002 |
| JP | 2003-051944 A | 2/2003 |
| JP | 2007-124087 A | 5/2007 |
| JP | 2010-183409 A | 8/2010 |

* cited by examiner

*Primary Examiner* — Andrae S Allison
(74) *Attorney, Agent, or Firm* — Arent Fox LLP (57) ABSTRACT

An image processing device having a brightness adjustment unit having a unit processing the brightness of each pixel and a frame buffer unfolding each brightness before and after processing, and a color adjustment unit having a unit processing the color of each pixel and a frame buffer unfolding each pixel color before and after processing. The ratio (f) of the brightness of each pixel before and after adjusting is input. When the ratio (f) is equal or larger than a color emphasis parameter (ColorRate), calculates anti-numerical value that subtract the ColorRate from the ratio (f), adds the ColorRate to this anti-numerical value, and multiplies a coordinate value of the color space by the added value. When the ratio (f) is smaller than the ColorRate, multiplies the ColorRate by the coordinate value of the color space, and outputs the color of each pixel to the frame buffer.

2 Claims, 7 Drawing Sheets

IMAGE PROCESSING DEVICE

FIELD OF THE INVENTION

This invention relates to an image processing device which converts an image containing a mixture of extremely bright and dark parts, such as a surveillance camera or indoor window, into a clear, easily viewed picture.

BACKGROUND ART

A surveillance camera may operate for 24 hours a day, therefore, extremely bright images and extremely dark images are constantly being recorded. The general automatic gain control of the camera often cannot keep up with an extremely large change. Also, when extremely dark and bright parts are mixed within the same picture, such as an indoor window, this cannot be dealt with by conventional automatic gain control.

As a conventional image evaluation technique, a method is known that uses a histogram to make a graph using a number of pixels, according to the brightness of each color. This method shows the pixel distribution in the image, it displays the detail of a shadow (the left-hand portion of the histogram), a halftone (the center of the histogram) and the highlight (the right-hand portion of the histogram), and judges whether this detail makes sufficient amendment to an image for it to be clearly seen.

For example, an imaging device is described in Patent document 1. This imaging device comprises; an imaging element to output an electrical signal performing photoelectric conversion of an optics image, signal processing means to generate a video signal processing electrical signal output by said imaging element, a histogram circuit which generates a histogram from a video signal output by the said signal processing means, and an exposure control means using a histogram detected by the said histogram circuit.

An image processing method is described in Patent document 2. This image processing method comprises; a process to generate an image data by reading light from a manuscript, a process to make a histogram of the density distribution from the image data, a process to generate a density amendment curve based on a ratio of the number of the data of the part which came close to the light and shade at both ends of the density distribution corresponding to the number of the entire data of the image data, a process to make a density amendment of the image data using the density amendment curve.

An imaging device is described in Patent document 3. This imaging device provides an imaging means and a gradation correcting means, the imaging means images a subject, and the image data of the subject is acquired, the gradation correcting means makes a harmony amendment to a pixel portion which is a predetermined pixel portion of the imaging image consisting of image data acquired by imaging means and to a pixel portion comprising the pixels that have a brightness level which is within a predetermined range.

Regarding Patent document 1, it is difficult for still image photography in real time when a CPU with a large processing capacity is not used with a picture which contains a large number of pixels.

Regarding Patent document 2, when a high capacity host computer is not used, there are problems in that the processing time is greatly increased.

Regarding Patent document 3, there is a problem with this method in that it is not practical for a moving image, because it takes too much time to calculate a histogram of the whole picture with a large number of pixels.

Then the inventor of this invention suggested an image processing device described in Patent document 4.—an image processing device which converts the brightness of the image by image scanning in one pass (step). Comprising:

Means for determining a histogram (hist i) of brightness information (i) about the locomotive area of a predetermined pattern including the scanning position of the image scanning, Means for determining cumulative frequencies (n) by accumulating the histogram (hist i) in the range of i≤p (p is the brightness information before the conversion of the scanning position), Means for converting brightness information (p) of the scanning position into brightness information depending on cumulative frequencies (n).

PRIOR ART

[Patent document 1] Japanese Laid Open Patent No. 2002-142150
[Patent document 2] Japanese Laid Open Patent No. 2003-051944
[Patent document 3] Japanese Laid Open Patent No. 2007-124087
[Patent document 4] Japanese Patent No. 4386959

DISCLOSURE OF INVENTION

Problems Solved by the Invention

According to Patent document 4, as an area is divided, it can convert the brightness of the image in 1 pass without operating the image, then it can easily carry out the real-time processing of VGA animation, by combining a graphics board with a cheap microcomputer or personal computer which are widely commercially available.

However, the processing by the image processing device suggested in Patent document 4, only carries out an adjustment of the brightness of each pixel and does not carry out an adjustment of the color, thus a problem which should be improved remains.

Means for Solving Problems

In order to solve the above-mentioned problems, an image processing device of the present invention converts the brightness and the color of the image by an image scanning of 1 pass (once), and carries out adjustment (coordination) of brightness and color simultaneously, comprising an adjustment means of brightness and an adjustment means of color.

The adjustment means of brightness has an operation processing unit which operates the brightness of each pixel, and a frame buffer which memorizes (unfolds) the brightness of each pixel before adjustment processing and after adjustment processing.

The adjustment means of color has an operation processing unit which operates the color of each pixel, and a frame buffer which memorizes (unfolds) the color of before adjustment processing and after adjustment processing of each pixel.

The ratio (f) of the brightness of each pixel before adjusting and after adjusting is input to the operation processing unit operating the color in the 1 pass, and in the case where the ratio (f) is equal or larger than a color emphasis parameter (ColorRate), calculates the anti-numerical value that subtracts the color emphasis parameter (ColorRate) from the ratio (f), adds the color emphasis parameter (ColorRate) to this anti-numerical value, and multiplies a coordinate value of the color space by the added value, and in the case where the ratio (f) is smaller than the color emphasis parameter (ColorRate), multiplies the color emphasis parameter (ColorRate) by the coordinate value of the color space, and outputs the color of each pixel to the frame buffer which memorizes (unfolds) the color of each pixel.

It is preferable that the color emphasis parameter (ColorRate) can be specified from the outside.

Effects of the Invention

The algorithm of the present invention is an algorithm to obtain the same result with a simple algorithm without having to use a 2 pass (twice) method.

It is possible to perform real-time processing of VGA animation by combining a graphic board and cheap microcomputer or personal computer, also, using hardware equipped for FPGA and processing with DSP are both possible, too.

BEST MODE FOR CARRYING OUT INVENTION

Implementation by FPGA is the most effective method for implementing the present invention, but implementation with a conventional computer system is possible, too.

The best mode for carrying out the invention is described below based on drawing sheet details.

Note that in the present invention, an old-type graphics board is not used. It is desirable to use a graphics board based on a multi-core GPU having 120 or more cores per processor.

Figure 1:
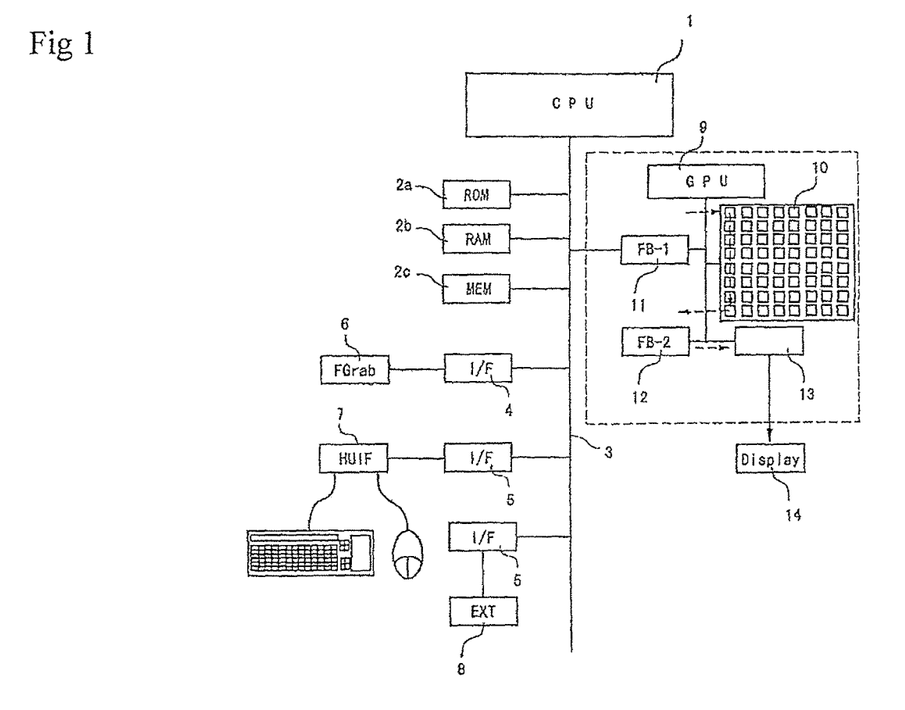
FIG. 1 A figure showing the basic example of the system

As shown in FIG. 1, the present system is basically a microcomputer or a personal computer equipped with a graphics board, CPU1 comprises frame grabber 6, an image is taken in this frame grabber 6 through system bus 3 and interface 4 such as a graphics board, ROM2a, RAM2b, PCI.

Also, to operate the devices, the present system has operation devices 7 such as buttons or external connections ports 8 such as serial port through I/O interface 5.

The graphics board is comprised of GPU9 having one parallel computation cell, processing frame buffer 11, output frame buffer 12, indication output circuit 13.

GPU9 receives instructions from CPU1 and processes the image data in processing frame buffer 11 according to the instructions to each cell, in order that a processing result is written in at frame buffer 12 for output.

There are plural cells performing parallel computations, the instructions from a CPU are processed at the number of cells simultaneously.

Firstly the CPU1 of the computer transfers software corresponding to the processing of this matter to RAM2b from ROM2a, and the software carries out the processes.

The software initiated repeats a series of tasks as follow.
(1) An image is taken from a frame grabber
(2) The image taken in is transferred to the processing frame buffer 11 on the graphics board
(3) Handling of this matter is indicated to GPU
(4) A cell in GPU performs instructions by parallel computation
(5) Wait until all processing results are written in at a frame buffer for output
(6) Display the result of processing A plurality of color space can be represented with frame buffer 12 for processing and frame buffer 11 for output, YCbCr, HSV, Lab, HLS are intended for use in this matter Indication output circuit 13 converts the details of frame buffer 12 for output becoming the color space expression into the video signal that is adapted to a display. Indication output circuit 13 supports a plurality of video signals, analog RGB is general, DVI, a component (D1-D4), YC separation, composites can be output.

Figure 2:
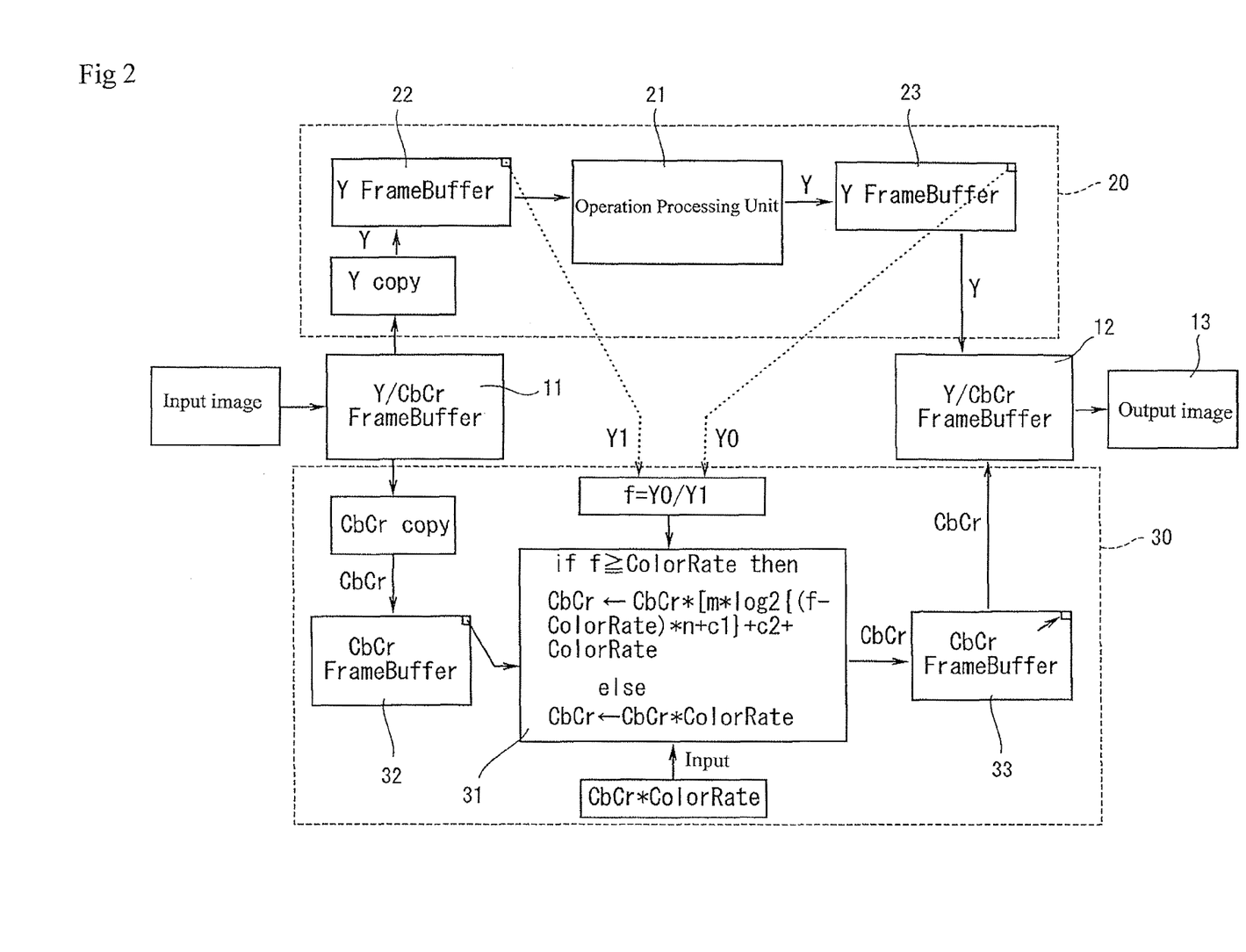
FIG. 2 A flow diagram of the processing

As for the image processing device of the present application, the CPU of the computer does not calculate, calculation is done by the GPU of the graphics board. Thereby, it can process dynamic data as a stream, the operation process is the kernel, it can carry out highly precise and high-speed processing by analyzing data in real time, The image processing device of the present invention carries out adjustment of brightness and color simultaneously. As shown in FIG. 2, an image (a pixel) which input into a processing frame buffer 11 is divided by brightness information and color information, the brightness information is processed in adjustment means (area) 20 of the brightness, and the color information is processed in adjustment means (area) 30 of the color.

An operation processing unit 21 and a frame buffer 22, 23 are provided as the adjustment means 20 of the brightness, the operation processing unit 21 operates the brightness of each pixel, the frame buffer 22, 23 memorize the brightness of each pixel with the operation processing unit 21 before and after the processing, and an operation processing unit 31 and a frame buffer 32, 33 are provided as the adjustment means 30 of the color, the operation processing unit 31 operates the color of each pixel, the frame buffer 32, 33 memorize the color of each pixel with the operation processing unit 31 before and after the processing.

Based on FIG. 3, a principle of the processing with the operation processing unit 21 which operates the brightness is explained below.

Figure 3:
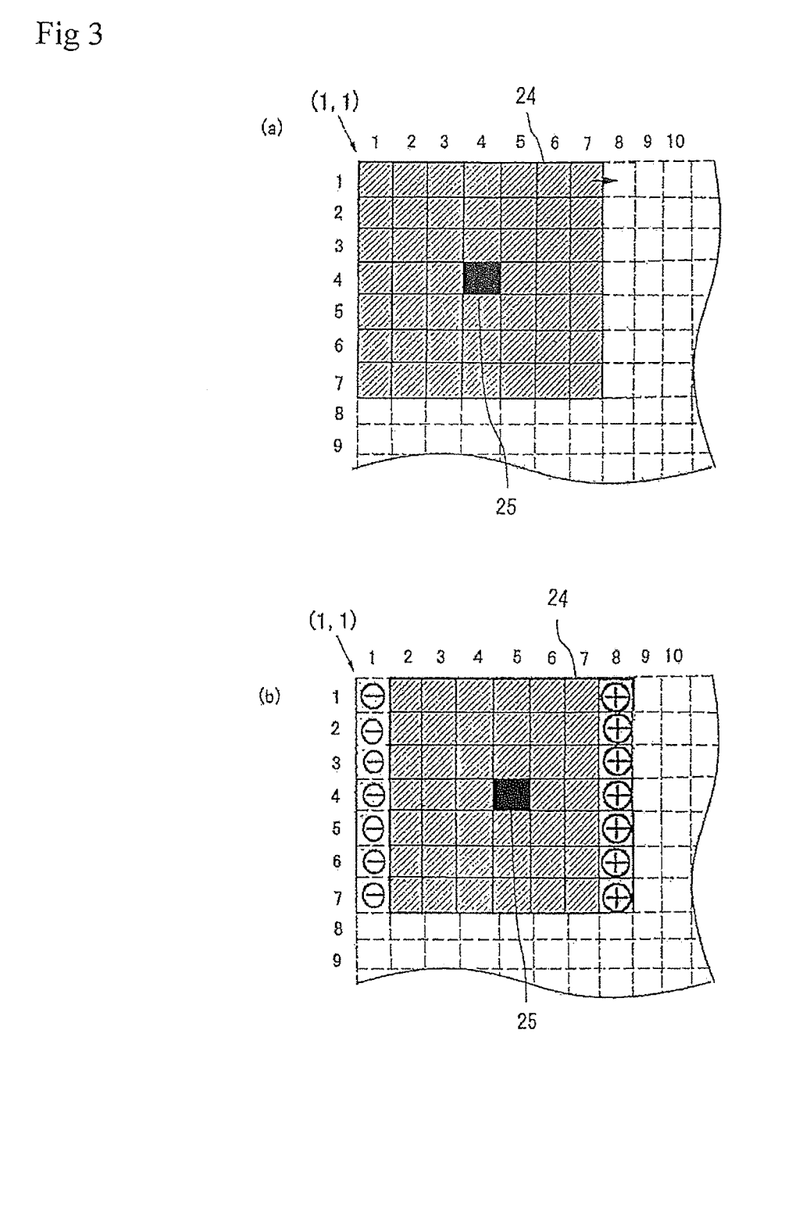
FIG. 3 A figure showing the foundation stone example of the histogram optimization of the pixel unit detection FIG. 4 A graph showing relations between the magnification of the color (CbCr) and the ratio (Y0/Y1) of the brightness by preceding image processing.

At first as shown in FIG. 3 (a), set a reading pattern 24 comprising predetermined pixels (7 length, 7 width), and a pixel which is located in the center of the reading pattern 24 is set as the target pixel 25, and calculate the value of the target pixel 25 from the histogram of a pixels (7 length, 7 width) comprising reading pattern 24 removed aim pixel 25.

A calculation method to obtain the average of the general histogram is applied.

Then as shown in FIG. 3(b), sift the reading pattern 24 and the aim pixel 25 to the right for one row.

When the aim pixel 25 sift to the right for one row, the selected pixels of reading pattern 24 from the second row to the seventh row among the selected pixels from the first row to the seventh row those are already used for the calculation of the histogram, the selected pixels from the second row to the seventh row are common with FIG. 3 (a), and the pixels of the eighth row are added to the selected pixels from the second row to the seventh row.

The pixels of the eighth row become a new calculation. However, it is not necessary to calculate the details of all the pixels again.

That is, subtract the first row data from a total value of the histogram which are in the area surrounded by pixel (1, 1), (1, 7), (7, 1), (7, 7), and add the data of the eighth row to the data from the second row to the seventh row, as above, thus the histogram can be easily calculated.

In FIG. 3 (b), the area surrounded with a solid line is the calculation area for the next calculation, and the pixel of line 4 row 5 is the target pixel 25 which is the subject of the next brightness calculation, and the area except for the target pixel 25 from the area surrounded with pixels (1, 2), (1, 8), (7, 2), (7, 8) becomes the calculation area.

As described above, the actual calculation can be processed in a short time, because only the first row histogram is subtracted from the previously calculated value and added to the eighth row histogram.

The method of averaging is not limited as above, a cull high speed processing to move reading pattern 24 one by one is applicable.

On the other hand, the adjustment of color is carried out simultaneously with the adjustment of brightness. In the adjustment of color, detect a brightness (Y1) which is before the adjustment and a brightness (Y0) which is after the adjustment of each pixel, and calculate the ratio (f)=Y0/Y1.

And if the ratio (f) is equal to or larger than a color emphasis parameter (ColorRate), calculate the anti-numerical value that subtracts the color emphasis parameter (ColorRate) from the ratio (f), then add the color emphasis parameter (ColorRate) to the anti-numerical value, and multiply a coordinate value of the color space by the added value.

The following formula is used for this calculation.

$CbCr \leftarrow CbCr[m^*\log 2\{(f-\text{ColorRate})^*n+c1\}+c2+\text{ColorRate}]$ Herein, m, n, c1, c2 are constants to properly perform a logarithmic curve. Incidentally, regarding the computer operation, the speed of calculation is much quicker when programmed to use addition and subtraction and a shift operation rather than multiplication and division.

Therefore, one computation phase can be done much faster by replacing the multiplication stage with a shift operation or addition or subtraction.

In an operation of the above, the multiplication portion of m and n can be replaced with a shift operation of binary digits.

Multiplication thereby becomes unnecessary by above method, and the speed of the operation can be increased.

Figure 4:
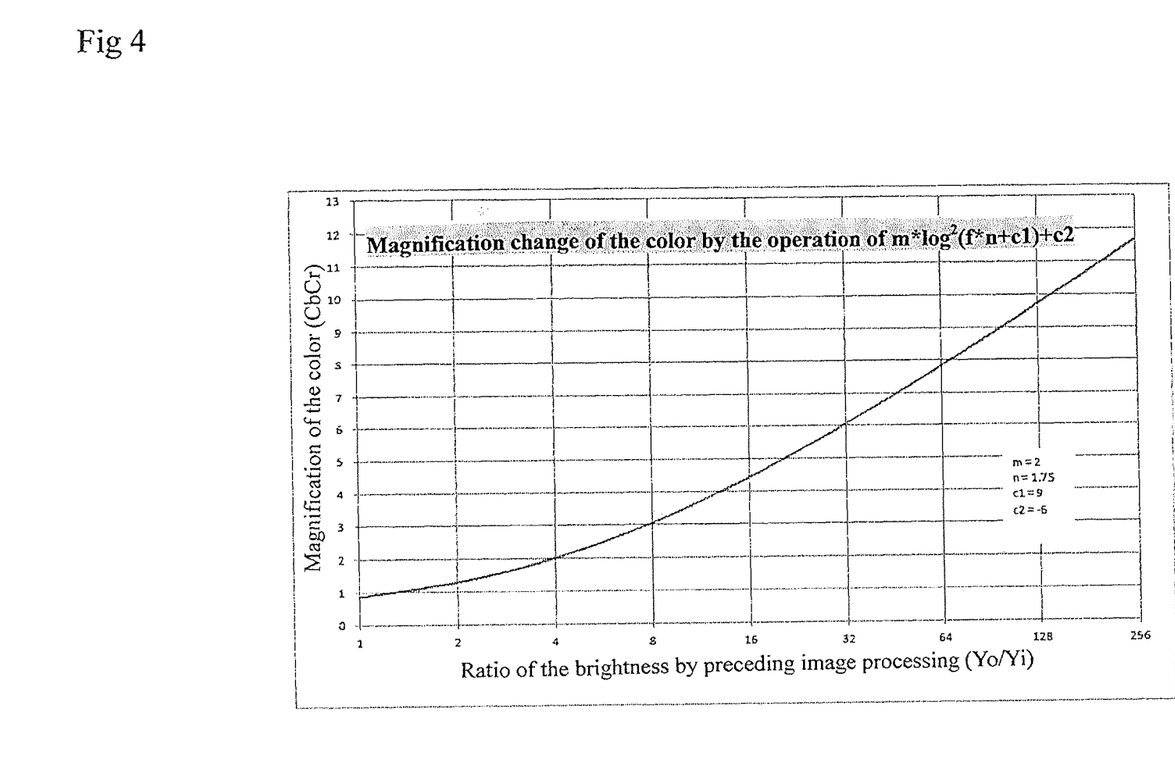

FIG. 4 shows a graph of relation between the magnification of the color (CbCr) and the ratio (Y0/Y1) of the brightness by preceding image processing, in the case of m=2, n=1.75, c1=9, c2=−6.

Even more particularly, with reference to the operation-type log 2 portion, the speed of the operation can be increased by finding an approximate value using the following methods: Because, in an operation such as this, decimal numerical value has little influence only an integer portion is calculated. As for the decimal portion, the numerical value of the bits is interpolated and this value becomes the value of the solution of the logarithm used in the operation. Thereby, a logarithm can be operated quickly. In other words, by looking for only an integer solution portion of the logarithm, speed of the operation can be made faster by using the integer.

Specifically, the integer region of the logarithmic solution is calculated by the number of bits to the upper limit of the logarithm (the figure number that assumed LSB 0).

TABLE 1

*Process example of 16-bits 4 decimal places

And if the ratio (f) is smaller than the color emphasis parameter (ColorRate), multiply the color emphasis parameter (ColorRate) by the coordinate value of the color space.

$CbCr \leftarrow CbCr^*\text{ColorRate}$

Alternatively, the color emphasis parameter (ColorRate) can be specified from the outside, the degree of the color adjustment can be altered.

Perform as above, the value (Y) of adjusted brightness is memorized (stored) to the frame buffer 23, the value (CbCr) of color space processed color emphasis is memorized to frame buffer 33, these values are sent to frame buffer 12 for output, and displayed through indication output circuit 13.

Figure 5:
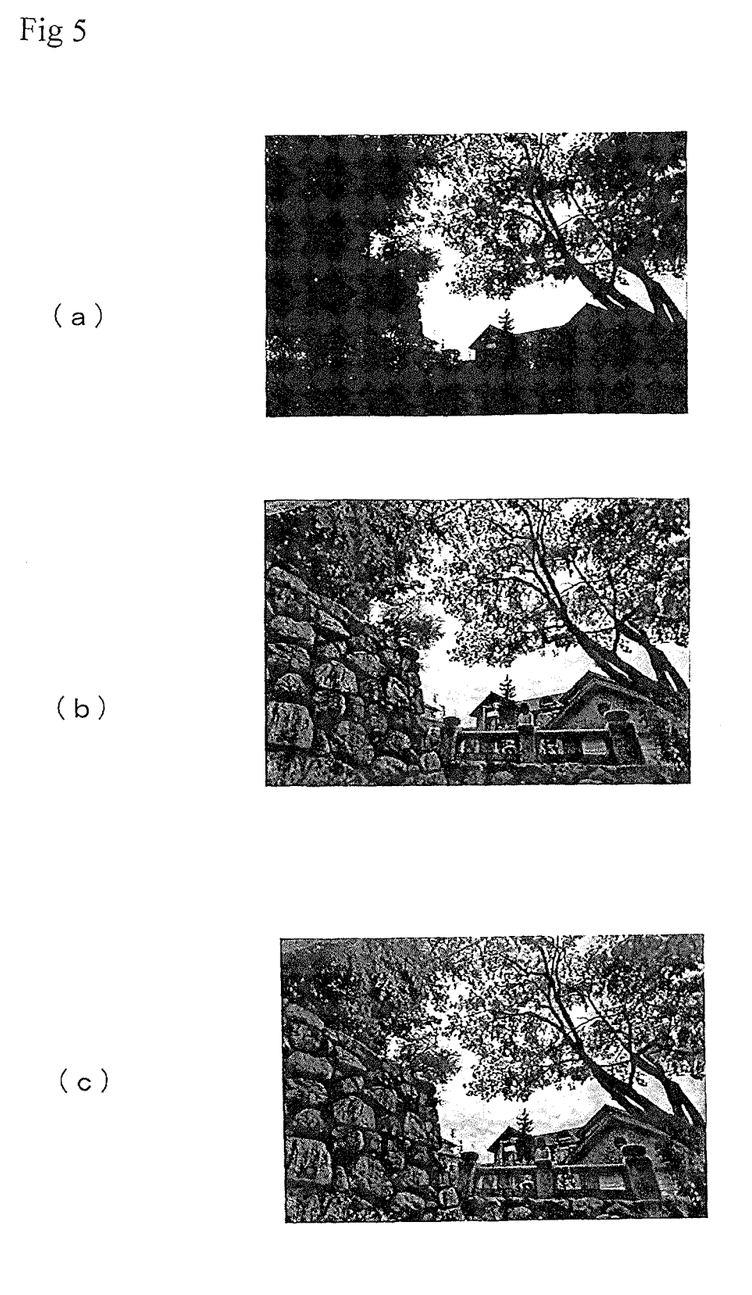
FIG. 5 Photographs comparing the image after the adjustment and before adjustment, (a) shows the image which does not have any adjustment of the brightness and the color, (b) shows the image which has had brightness adjustment only, (c) shows the image which has had adjustment to both the brightness and the color FIG. 6 Photographs comparing the image after the adjustment and before adjustment, (a) shows the image which does not have any adjustment of the brightness and the color, (b) shows the image which has had adjustment of the brightness only, (c) shows the image which has had adjustment of both the brightness and the color FIG. 7 Photographs comparing the image after the adjustment and before adjustment, (a) shows the image which does not have adjustment to the brightness and the color, (b) shows the image which has had brightness adjustment only, (c) shows the image which has had both the brightness and the color adjusted.
Figure 6:
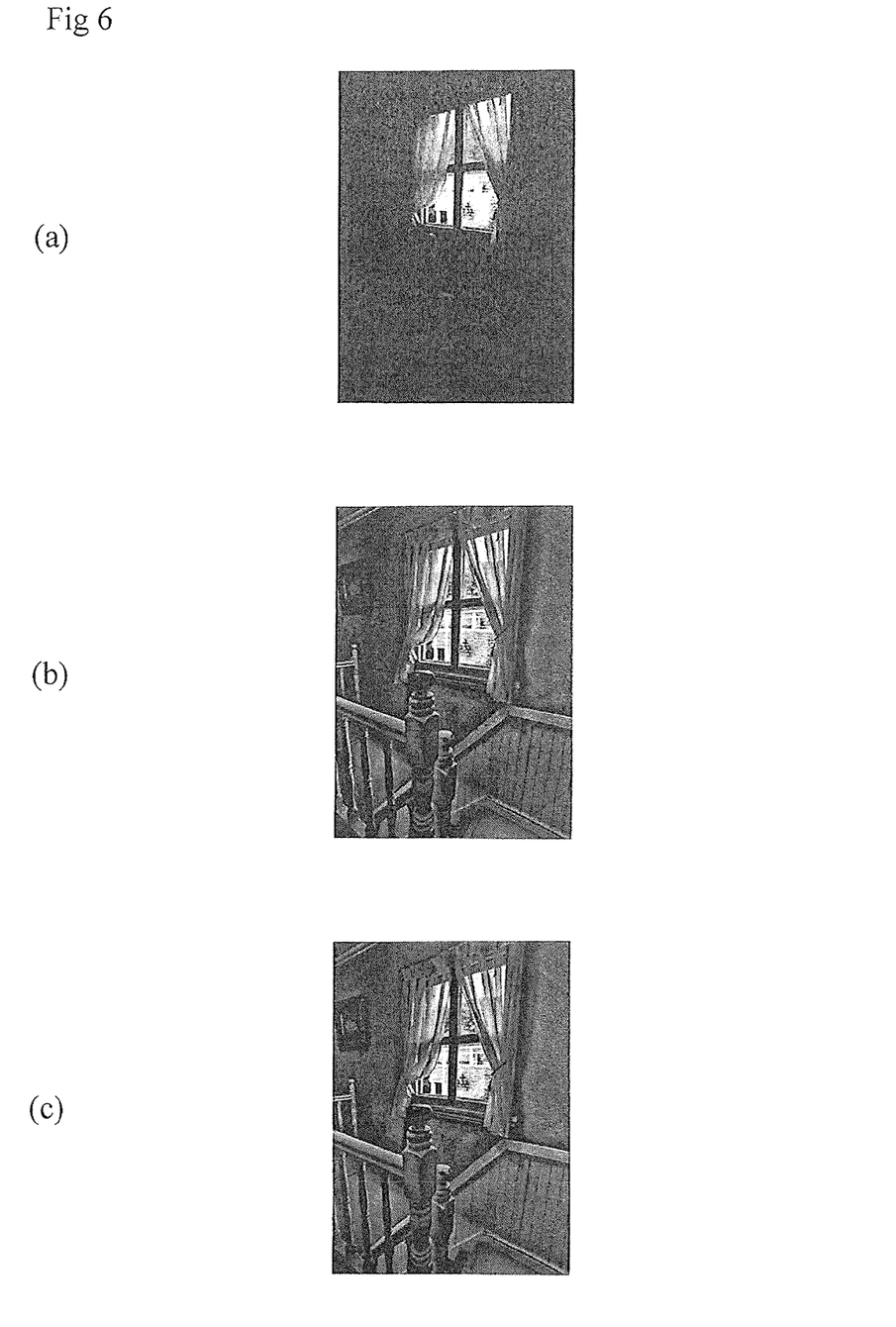
Figure 7:
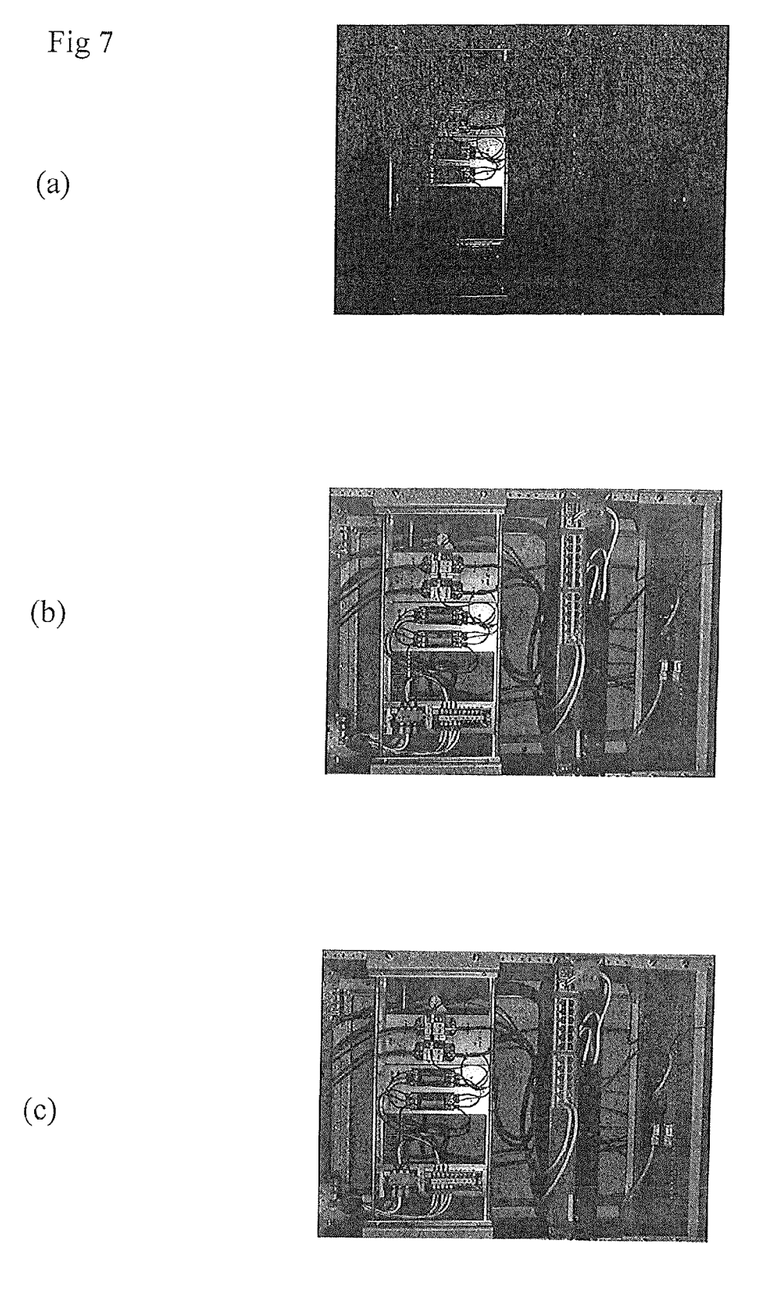

FIG. 5 to FIG. 7 are images of outside scenery, an image in a house and an image of a switchboard, and (a) shows the image with no adjustment of the brightness and the color, (b) shows the image with adjustment of the brightness only, (c) shows the image with adjustment of both the brightness and the color.

It can be seen from these image that the image in which both the brightness and the color were adjusted using the image processing device of the present invention is superior in perspective and can clearly discriminate detail in comparison with the other images.

INDUSTRIAL APPLICABILITY

The image processing device of the present invention is available for use as equipment carrying out image processing such as surveillance cameras in real time.

EXPLANATIONS OF THE LETTERS AND NUMERALS

1 . . . CPU, 2*a* . . . ROM, 2*b* . . . RAM, 3 . . . system bus, 4 . . . interface, 5 . . . interface, 6 . . . frame grabber, 7 . . . operation device, 8 . . . external connections ports, 9 . . . GPU, 10 . . . GPU memory, 11 . . . input frame buffer, 12 . . . output frame buffer, 13 . . . indication output circuit, 20 . . . adjustment means of brightness, 21 . . . operation processing unit, 22, 23 . . . frame buffer, 24 . . . reading pattern, 25 . . . target pixel, 30 . . . adjustment means of color, 31 . . . operation processing unit, 32, 33 . . . frame buffer.

The invention claimed is:

1. An image processing device configured to convert the brightness and the color of an image by image scanning of 1 pass, and carry out adjustment (coordination) of brightness and color simultaneously, the image processing device comprising:
an adjustment means of brightness and an adjustment means of color,
wherein the adjustment means of brightness comprises a first operation processing unit configured to adjust the brightness of each pixel, and a first frame buffer configured to store the brightness of each pixel before and after adjustment processing,
wherein the adjustment means of color comprises a second operation processing unit configured to adjust the color of each pixel, and a second frame buffer configured to store the color of each pixel before and after adjustment processing,
wherein a ratio of the brightness of each pixel before adjusting and after adjusting is input to the second operation processing unit,
upon detecting that the ratio is equal or greater than a color emphasis parameter, the second operation processing unit is configured to: calculate an anti-numerical value that subtracts the color emphasis parameter from the ratio, add the color emphasis parameter to the anti-numerical value, and multiply a coordinate value of a color space by the added value, and
upon detecting that the ratio is less than the color emphasis parameter, the second operation processing unit is configured to: multiply the color emphasis parameter by the coordinate value of the color space, and output the color of each pixel to the second frame buffer.

2. The image processing device according to claim 1, wherein the color emphasis parameter is specified from the outside.

\* \* \* \* \*